（12）United States Patent
Sanders et al.

(10) Patent No.: US 9,671,299 B2
(45) Date of Patent: Jun. 6, 2017

(54) FLUID REGULATOR HAVING A RETRACTABLE SENSE TUBE

(71) Applicant: EMERSON PROCESS MANAGEMENT REGULATOR TECHNOLOGIES, INC., McKinney, TX (US)

(72) Inventors: Jeffrey Michael Sanders, Dallas, TX (US); Tung Kim Nguyen, McKinney, TX (US)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 0 days.

(21) Appl. No.: 14/827,738

(22) Filed: Aug. 17, 2015

(65) Prior Publication Data

US 2016/0069469 A1 Mar. 10, 2016

Related U.S. Application Data

(60) Provisional application No. 62/048,487, filed on Sep. 10, 2014.

(51) Int. Cl.
  *F16K 17/00* (2006.01)
  *G01L 7/00* (2006.01)
  *G05D 16/06* (2006.01)

(52) U.S. Cl.
  CPC ............ *G01L 7/00* (2013.01); *G05D 16/0694* (2013.01)

(58) Field of Classification Search
  CPC ....... G05D 16/0694; G01L 7/00; F16K 17/10; F16K 17/17–17/164
  See application file for complete search history.

(56) References Cited

U.S. PATENT DOCUMENTS 1,918,602 A * 7/1933 Joyce ................. G05D 16/0677
  137/484.4
2,619,983 A * 12/1952 Roberts ................. F16K 31/165
  137/116.5

(Continued)

FOREIGN PATENT DOCUMENTS

WO WO-2011088228 A2 7/2011

OTHER PUBLICATIONS

International Search Report for Application No. PCT/US2015/049280 dated Jun. 17, 2016.

(Continued)

*Primary Examiner* — Umashankar Venkatesan
(74) *Attorney, Agent, or Firm* — Marshall, Gerstein & Borun LLP (57) ABSTRACT

A fluid regulating device includes a valve body having an inlet, an outlet, and a valve port, a control element adapted to be displaced relative to the valve port to control the flow of a fluid between the inlet and the outlet, a control assembly operatively coupled to the control element and including a diaphragm disposed adjacent a diaphragm chamber, and a sense tube. The sense tube has a first end, a second end, and a sense hole formed adjacent the second end. The first end is positioned to communicate with the diaphragm chamber, and the second end is disposed adjacent the outlet, with the second end being movable, relative to the first end, between a first position within the valve body and a second position extending outside of the valve body, the movement being in response to fluid flowing between the inlet and the outlet.

20 Claims, 5 Drawing Sheets

(56) References Cited

U.S. PATENT DOCUMENTS

| | | | | |
|---|---|---|---|---|
| 2,690,758 | A | * | 10/1954 | Lee ............... B60T 11/32 |
| | | | | 137/460 |
| 3,086,548 | A | * | 4/1963 | Galiger ........... G05D 16/0613 |
| | | | | 137/116.5 |
| 5,094,267 | A | | 3/1992 | Ligh |
| 8,281,803 | B2 | | 10/2012 | Mevius et al. |
| 8,336,574 | B2 | | 12/2012 | Kranz et al. |
| 2008/0257418 | A1 | | 10/2008 | Kranz et al. |
| 2011/0174381 | A1 | * | 7/2011 | Foust ............... G05D 16/02 |
| | | | | 137/1 |
| 2014/0083530 | A1 | | 3/2014 | Fan |
| 2014/0090726 | A1 | * | 4/2014 | Hawkins ........... G05D 16/0694 |
| | | | | 137/505.13 |
| 2014/0090727 | A1 | | 4/2014 | Nguyen et al. |
| 2015/0355642 | A1 | * | 12/2015 | Sanders ............. G05D 7/012 |
| | | | | 137/484.2 |

OTHER PUBLICATIONS

Written Opinion for Application No. PCT/US2015/049280 dated Jun. 17, 2016.

* cited by examiner

FLUID REGULATOR HAVING A RETRACTABLE SENSE TUBE

FIELD OF THE INVENTION

The present invention relates generally to regulators such as fluid or gas regulators and, more specifically, to a regulator having a retractable pressure sense tube.

BACKGROUND

Regulators are commonly employed in fluid or gas distribution systems to control the pressure in the system downstream of the regulator. As is known, the pressure at which a typical gas distribution system supplies gas may vary according to the demands placed on the system, the climate, the source of the supply, and/or other factors. However, most end-user facilities equipped with gas appliances such as, for example, furnaces, and ovens, require the gas to be delivered in accordance with predetermined pressure parameters. Therefore, such distribution systems use gas regulators to ensure that the delivered gas meets the requirements of the end-user facilities.

Conventional gas regulators generally include a closed-loop control actuator or control assembly for sensing and controlling the pressure of the delivered gas. Many regulators use a pneumatic control assembly having a diaphragm and a sense tube, such as a Pitot tube, that extends into and out (or downstream of) the outlet side of the regulator. The tube senses, for example, the pressure or other parameters in the downstream or outlet end of the regulator, and communicates that sensed parameter to the control assembly. Based on the sensed parameter, the control assembly makes any needed adjustments to the position of a control element, which then keeps the sensed parameter at a desired value or within an acceptable range.

Figure 1:
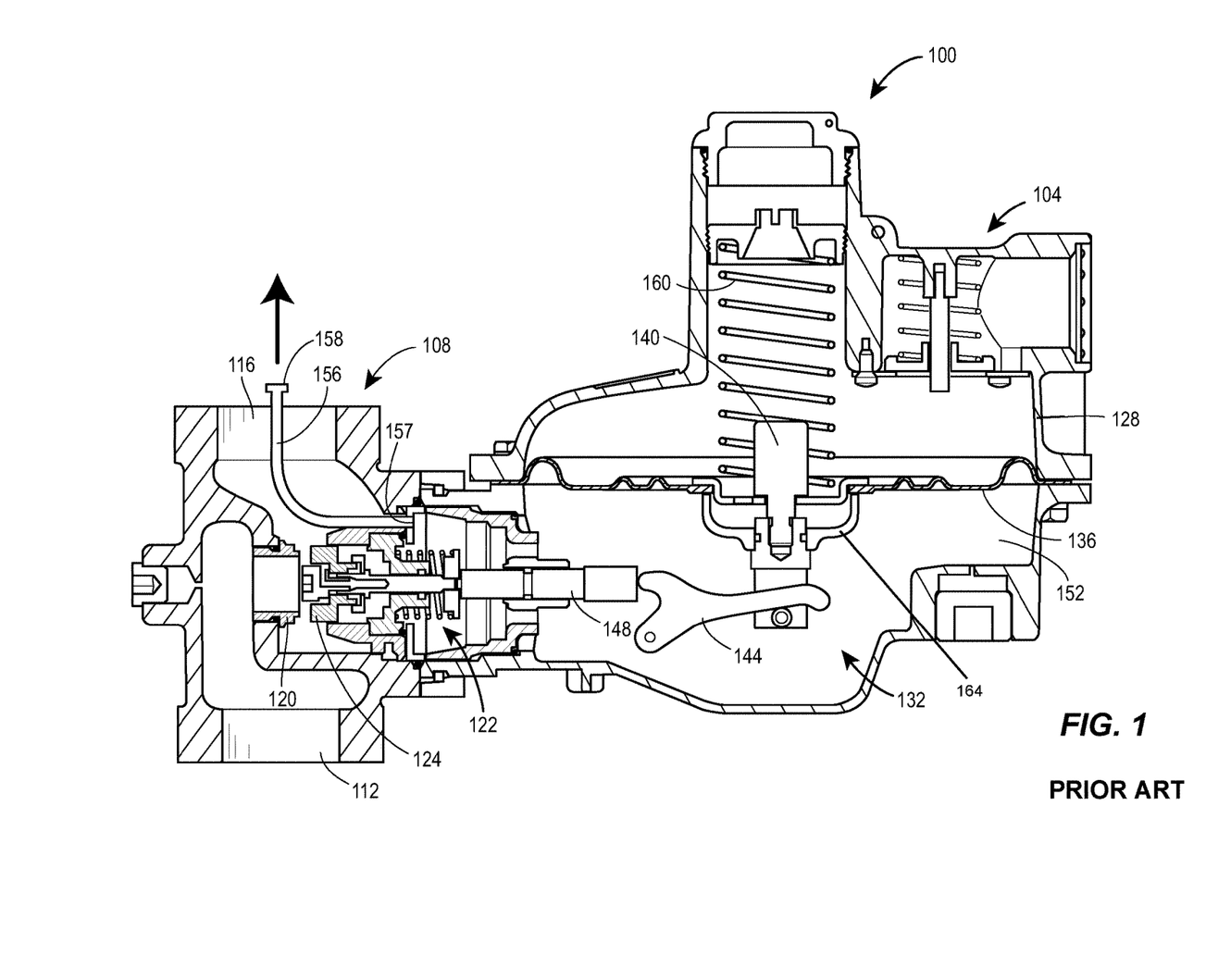
FIG. 1 is a cross-sectional view of a conventional fluid regulating device having a sense tube that extends from a diaphragm chamber of a control assembly to a position downstream of an outlet of the device.

FIG. 1 depicts an example of a conventional regulator device 100. The regulator device 100 generally includes an actuator 104 coupled to a valve body 108. The valve body 108 includes an inlet 112, an outlet 116, and a valve port 120 disposed between the inlet 112 and the outlet 116. The regulator 100 further includes a balanced port control assembly 122 that is mounted within the valve body 108 and that aims to improve the reaction of the regulator 100 to variations in the downstream pressure. The balanced port control assembly 122 includes, in relevant part, a control element 124 that is movable relative to the valve port 120.

The actuator 104 is coupled to the valve body 108 to ensure that the pressure at the outlet 116 of the valve 108, i.e., the outlet pressure, is in accordance with a desired outlet or control pressure. The actuator 104 is a diaphragm-based actuator and includes an actuator housing 128 containing a control assembly 132 for regulating the outlet pressure of the valve body 108 based on sensed outlet pressure. The control assembly 132 generally includes a diaphragm 136, a piston 140, and a control arm 144 operatively connected to a valve stem 148. The valve stem 148 is connected to the movable control element 124 of the balanced port control assembly 122, such that movement of the actuator 104 moves the control element 124 relative to the valve port 120. The control assembly 132 also includes a diaphragm chamber 152, which is in fluid communication with the outlet 116 via a sense tube 156. The sense tube 156 has a mounting end 157 in fluid communication with the diaphragm chamber 152 and a flared and open sensing end 158 disposed opposite the end 157 and configured to sense the pressure at or in the outlet 116. To maximize the sensing of developed flow, which is advantageous, the end 158 extends downstream past (i.e., is disposed outside of) the outlet 116 of the valve body 108. The control assembly 132 further includes a control spring 160 in engagement with a top side of the control assembly 132 to offset the outlet pressure sensed by the diaphragm 136. Accordingly, the desired outlet pressure, which may also be referred to as the control pressure, is set by the selection of the control spring 160.

Generally speaking, the inlet 112 of the regulator device 100 receives gas from a gas distribution system, for example, and the outlet 116 delivers gas to an end-user facility such as a factory, a restaurant, an apartment building, etc. having one or more appliances. The actuator 104, via the control assembly 132, controls the position of the control element 124, and, consequently, gas flowing through the regulator device 100 flows into the inlet 112, through the valve port 120, and out the outlet 116 to the end-user facility, with the position of the control element 124 thus controlling the flow of gas through the device.

The control assembly 132 regulates the outlet pressure of the body 108 of the regulator device 100 based on the outlet pressure sensed in or at the outlet 116. More specifically, the diaphragm 136 senses the outlet pressure of the valve 108 and provides a response to move the valve stem 148 to open and close the valve 108. Specifically, the control assembly 132 includes a diaphragm support plate 164 coupled to the piston 140, which together move the position of the diaphragm 136, the control arm 144, the valve stem 148, and ultimately the control element 124. The open, sensing end 158 of the sense tube 156 senses the pressure in or at the outlet 116. If the sensed pressure is too low, the pressure in the diaphragm chamber 152 drops accordingly by virtue of the flow communication provided by the mounting end 157 of the sense tube 156. Consequently, because the desired control pressure is applied to the piston side of the actuator 104, the pressure differential will cause the diaphragm 136 to move (to the right when viewing FIG. 1), which in turn moves the control element 124 (upward when viewing FIG. 1). This opens the valve port 120 more, thus increasing the pressure in the outlet 116. On the other hand, if the sensed pressure is too high, the pressure in the diaphragm chamber 152 is greater than the desired control pressure, and the pressure differential against the diaphragm 136 causes the diaphragm 136 to move (to the left when viewing FIG. 1), thus moving the control element 132 closer to the valve seat, which decreases the flow through the valve port 120.

As noted above, the sense tube 156 has a mounting end 157 and a flared and open sensing end 158. When fluid flows from the inlet 112, through the valve port 120, and out the outlet 116 over and past the sense tube 156, the sense tube 156 senses the pressure of the fluid at the flared and open sensing end 158. In high flow situations, however, there tends to be a large pressure drop across the flared and open sensing end 158, such that the sense tube 156 detects an artificially low pressure at the flared and open sensing end 158. In other words, the sense tube 156 senses a pressure that is lower than the actual pressure at the outlet 116. When the sense tube 156 communicates this artificially low pressure, via the mounting end 157, to the diaphragm chamber 132, this causes the diaphragm 136 to move (to the right when viewing FIG. 1) more than necessary or required, which in turn moves the control element 124 upward (when viewing FIG. 1) more than necessary and opens the valve port 120 more than necessary. Accordingly, the sense tube 156 may boost the downstream outlet pressure out of accuracy, thereby limiting the capacity of the regulator 100.

Moreover, because the flared and open sensing end 158 of the sense tube 156 extends downstream past the outlet 116 of the valve body 108, this makes the manufacture, and subsequent assembly, of the regulator device 100 more difficult. The end 158, because it extends outside of the valve body 108, may also make it more difficult to install the regulator device 100 into an existing pipe line and/or remove the regulator device 100 from an existing pipeline. Accordingly, such an arrangement, although advantageous for the purpose of maximizing the sensing of developed flow at the outlet 116, may be a source of customer and manufacturing complaint.

SUMMARY

In accordance with a first exemplary aspect of the invention, a fluid regulating device includes a valve body, a control element, a control assembly, and a sense tube. The valve body has an inlet, an outlet, and a valve port. The control element is adapted to be displaced relative to the valve port to control the flow of a fluid between the inlet and the outlet. The control assembly is operatively coupled to the control element and includes a diaphragm disposed adjacent a diaphragm chamber. The sense tube has a first end, a second end, and a sense hole formed adjacent the second end. The first end is positioned to communicate with the diaphragm chamber, and the second end is disposed adjacent the outlet, with the second end being movable, relative to the first end, between a first position within the valve body and a second position extending outside of the valve body, the movement being in response to fluid flowing between the inlet and the outlet.

In accordance with a second exemplary aspect of the invention, a fluid regulating device includes a valve body, a control element, a control assembly, and a sense tube. The valve body has an inlet, an outlet, and a valve port. The control element is adapted to be displaced relative to the valve port to control the flow of a fluid between the inlet and the outlet. The control assembly is operatively coupled to the control element and includes a diaphragm disposed adjacent a diaphragm chamber. The sense tube has a first end, a second end, and a sense hole, the first end positioned to provide flow communication with the diaphragm chamber of the control assembly, and the second end disposed proximate to the outlet. The sense tube includes a first portion and a second portion, the first portion including the first end of the sense tube, and the second portion including the second end and the sense hole of the sense tube. The second portion is movable, relative to the first portion, between a first position within the valve body and a second position at least partially extending outside of the valve body adjacent a distal portion of the outlet, the movement being in response to fluid flowing between the inlet and the outlet.

In accordance with a third exemplary aspect of the invention, a sense tube assembly is provided for sensing output pressure for a fluid regulating device that includes a valve body, a control element shiftably disposed within the valve body, and a control assembly operatively coupled to the control element, the valve body having an inlet, an outlet, and a valve port, the control element adapted to be displaced relative to the valve port to control the flow of a fluid between the inlet and the outlet, and the control assembly including a diaphragm disposed adjacent a diaphragm chamber. The sense tube assembly includes a first portion, a second portion, and a biasing element. The first portion is adapted to be positioned to provide flow communication with the diaphragm chamber of the control assembly. The second portion is adapted to be positioned proximate to the outlet, the second portion including an end and a sense hole for sensing pressure at the outlet, the end of the second portion being movable relative to the first portion. The biasing element is arranged to bias the end of the second portion to a first position, the end of the second portion being movable to a second position downstream of the first position in response to fluid flowing between the inlet and the outlet.

In further accordance with any one or more of the foregoing first, second, or third exemplary aspects, a fluid regulating device and/or sense tube assembly may include any one or more of the following further preferred forms.

In one preferred form, the second end can be movable along an axis that is at least substantially parallel to an axis of the outlet.

In another preferred form, the second end can be closed. The sense hole can be formed proximate to the closed second end and can extend along an axis that is angled relative to an axis of the outlet.

In another preferred form, the sense tube can have a flared portion disposed at the second end. The sense hole can be spaced away from and upstream of the flared portion. The second end of the sense tube can move in response to fluid flowing around the flared portion.

In another preferred form, a biasing element can be arranged to bias the second end of the sense tube to the first position.

In another preferred form, a sleeve can be disposed around a portion of the sense tube extending between the first and second ends of the sense tube. The sleeve can have an external diameter greater than an external diameter of the sense tube. The biasing element can be movably disposed in the sleeve.

In another preferred form, the second end can be movably coupled to the sleeve.

In another preferred form, the sense tube can have a first portion and a second portion. The first portion can include the first end and an intermediate portion. The second portion can carry the second end and the sense hole. The second portion can move relative to the first portion in response to fluid flowing between the inlet and the outlet.

In another preferred form, the second portion can extend along a central longitudinal axis. The second end can be closed and the sense hole can be formed in the second portion upstream of the closed end. The sense hole can extend along an axis that is angled relative to the central longitudinal axis.

In another preferred form, the second portion can slide between the first position and the second position.

In another preferred form, the second end can be flared. The second portion can move in response to fluid flowing around the flared second end.

In another preferred form, a sleeve can extend along a portion of the sense tube. The sleeve can have an external diameter greater than an external diameter of the sense tube. The first portion of the sense tube can be fixedly coupled to the sleeve. The second portion of the sense tube can be movably coupled to the sleeve.

In another preferred form, a biasing element can be movably disposed in the sleeve. The biasing element can be arranged to bias the second portion of the sense tube to the first position.

In another preferred form, the second portion of the sense tube can be telescopically disposed within the sleeve.

In another preferred form, the second portion can be in the first position when no fluid is flowing between the inlet and the outlet. The second portion can move to the second position in response to a pre-determined level of fluid flowing between the inlet and the outlet.

In another preferred form, the second portion can include a flared portion carried adjacent the end. The end can move to the second position in response to fluid flowing around the flared portion.

In another preferred form, the end of the second portion can be closed and the sense hole can be formed upstream of the closed end. The sense hole can extend along an axis that is angled relative to a central longitudinal axis of the second portion.

In another preferred form, a sleeve can extend along a portion of the sense tube. The sleeve can have an external diameter greater than an external diameter of the first and second portions. The first portion can be fixedly coupled to the sleeve. The second portion can be movably coupled to the first portion via the sleeve.

In another preferred form, the second portion can includes a seating element movably disposed within the sleeve. The biasing element can be seated on the seating element.

DETAILED DESCRIPTION OF THE PREFERRED EMBODIMENTS

The present disclosure is directed to a sense tube for a fluid regulating device. The sense tube disclosed herein includes a sense hole, for sensing outlet pressure, that is formed in the tube at an angle (e.g., 90 degrees) relative to an outlet axis and, thus, the flow of fluid. In doing so, this reduces, if not removes, the velocity component of pressure. The sense tube also includes a closed end (which is normally open), thereby reducing, if not eliminating, the large pressure drop typically seen in conventional sense tubes. The sense tube disclosed herein thus provides for a more accurate outlet pressure signal, which in turn improves the accuracy and maximum performance of the fluid regulating device.

The sense tube disclosed herein is also movable such that an end of the sense tube can under, for example, zero-to-low flow conditions (e.g., during manufacture, assembly, etc.) be completely disposed or retracted within the valve body, but can move further downstream as the flow increases to accurately sense outlet pressure. Under, for example, normal-to-high flow conditions (i.e., the fluid regulating device is in operation), the end of the sense tube extends downstream past an outlet of a valve body of the fluid regulating device. The sense tube disclosed herein thus accurately senses outlet pressure while at the same time simplifying the manufacture, and subsequent assembly and installation, of the fluid regulating device, thereby addressing a common source of customer and manufacturing complaint.

Figure 2A:
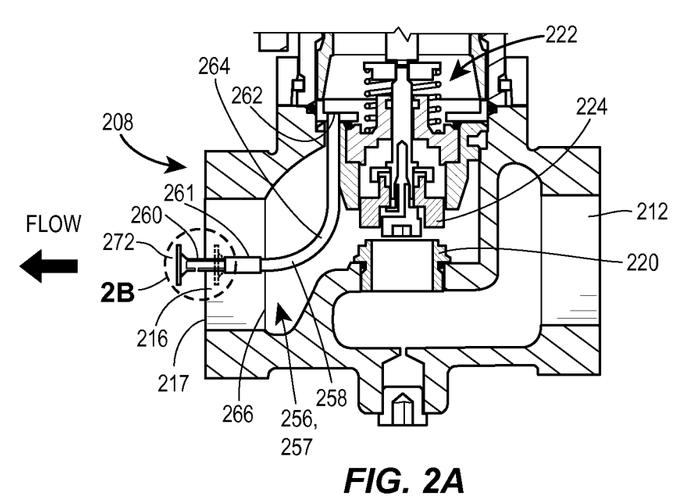
FIG. 2A is an enlarged fragmentary cross-sectional view of a fluid regulating device having a sense tube assembled in accordance with the teachings of a first disclosed example of the present invention.

FIG. 2A illustrates an example of a portion of fluid regulating device 200 assembled in accordance with the teachings of a first disclosed example of the present invention. The portion of the fluid regulating device 200 illustrated in FIG. 2 includes a valve body 208. The valve body 208 includes an inlet 212, an outlet 216, and a valve port 220 disposed between the inlet 212 and the outlet 216. The regulator 200 further includes a balanced port control assembly 222 that is mounted within the valve body 208 and aims to improve the reaction of the regulator 200 to variations in the downstream pressure. The balanced port control assembly 222 includes, in relevant part, a control element 224 that is shiftably disposed within the valve body 208, such that the control element 224 can be displaced relative to the valve port 220 in order to control the flow of the fluid between the inlet 212 and the outlet 216. The control element 224 is connected to the control assembly 132, which is described above in connection with FIG. 1 and which controls the position of the control element 224, though any other suitable control assembly may instead be used. Consequently, the control assembly employed in the fluid regulating device 200 will include the same or similar components described above in connection with FIG. 1, such as the diaphragm 136, the piston 140, the control arm 144, the valve stem 148, the diaphragm chamber 152, and the control spring 160.

Instead of the sense tube 156, which, as outlined above, tends to sense artificially low outlet pressures (e.g., a pressure that is lower than the pressure at the outlet 216) and complicates the manufacture, and subsequent assembly, of the fluid regulating device 100 (because it permanently extends downstream past or outside of the outlet 116), the fluid regulating device 200 includes a sense tube 256 that is configured to more accurately sense the pressure at the outlet 216 and is spring-loaded and force-balanced to partially extend outside of the outlet 216 of the valve body 208 under normal or high flow conditions (e.g., during operation of the fluid regulating device 200) but retracts within the valve body 208 under low or no flow conditions (e.g., during installation of the fluid regulating device 200 into the pipe line).

With reference to FIG. 2A, the sense tube 256 generally includes a cylindrical tube 257 that has a first portion 258 and a second portion 260 movably coupled to the first portion 258 via a sleeve 261. The first portion 258 has a first or mounting end 262 and an intermediate or bent portion 264. The first end 262 is positioned within the valve body 208 to provide flow communication with the diaphragm chamber 152 of the control assembly 132. The intermediate portion 264 is disposed adjacent an intermediate portion 266 of the outlet 216. The second portion 260, which is downstream of the first portion 258, is generally positioned to sense the outlet pressure at the outlet 216. The second portion 260 extends along a central longitudinal axis 268 that is parallel to an axis 270 of the outlet 216 (see FIG. 2B) and, thus, the flow of fluid through or at the outlet 216. The second portion 260 terminates at a second end 272 and has a sense hole 274 (best seen in FIG. 2B). The sleeve 261 is disposed around or over a portion of the sense tube 256 between the first and second ends 262, 272. Further details regarding the sleeve 261 and components disposed therein will be described below. As will also be described in greater detail below, the second portion 260, and more particularly the second end 272 and the sense hole 274, are movable, relative to the first portion 258, between a first position within the valve body 208 (see position shown in dashed lines in FIG. 2A) and a second position extending outside of the valve body 208 (see position shown in solid lines in FIG. 2A) and, when the fluid regulating device 200 is in operation, into or within a downstream pipe (not shown) coupled to the valve body 208 at the outlet 216.

Figure 2B:
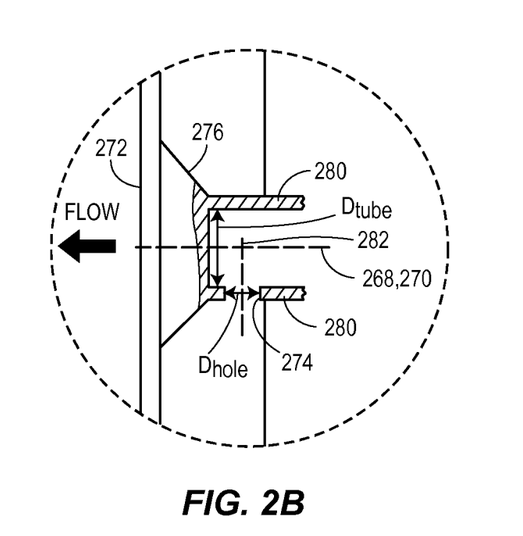
FIG. 2B is an enlarged fragmentary cross-sectional view of a downstream end of the sense tube illustrated in FIG. 2A.

As best illustrated in FIG. 2B, the sensing tube 256 is flared or has a flared portion 276 disposed immediately adjacent the second end 272 of the second portion 260, similar to the sense tube 156 described above, which has a flared sensing end 158. However, unlike the sense tube 156, wherein the flared sensing end 158 is open, and which senses the outlet pressure at this flared and open sensing end 158, the second end 272 of the sense tube 256 is closed. Thus, the sense tube 256 does not sense the outlet pressure via the end 272, thereby eliminating the large pressure drop seen in the sense tube 156 and other conventional sense tubes. Instead, for this purpose, the sense tube 256 includes the sense or sensing hole 274, which is formed upstream of the end 272 in or along the second portion 260 of the sense tube 256. Advantageously, the sense hole 274 is oriented and extends in a direction that is normal to the direction of fluid flow, thereby reducing, if not completely removing, the velocity component of pressure. The location of the sense hole 274 is generally biased to be in the semi-cylindrical portion, quadrant, or other portion of the downstream pipe with the greatest concentration of total static pressure, though this need not always be the case.

As illustrated in FIG. 2B, the sensing hole 274 in the depicted example is formed in a tubular wall 280 of the second portion 260 of the sense tube 256 at a position that is immediately adjacent or proximate to, but spatially separated from, the flared but closed end 272 of the sense tube 256. The diameter $D_{hole}$ of the sensing hole 274 will generally vary according to the overall size of the regulating device 200, e.g., according to the internal diameter $D_{tube}$ of the sense tube 256. In some embodiments, the diameter $D_{hole}$ of the sensing hole 274 can be in a range of between 50% to 150% the size of the internal diameter $D_{tube}$ of the sense tube 256. In the depicted example, the sensing hole 274 is a 1.2 mm diameter circular hole that is formed in a lower semi-cylindrical portion of the tubular wall 280, the lower semi-cylindrical portion being defined as or corresponding to the portion of the tubular wall 280 located below a plane in which the central longitudinal axis 268 lies (when viewed from FIG. 2B). As illustrated in FIGS. 2A and 2B, the sensing hole 274 is oriented and extends along an axis 282 that is perpendicular to both the central longitudinal axis 268 and the axis 270 of the outlet (and thus the flow of fluid at or through the outlet 216).

Figure 3:
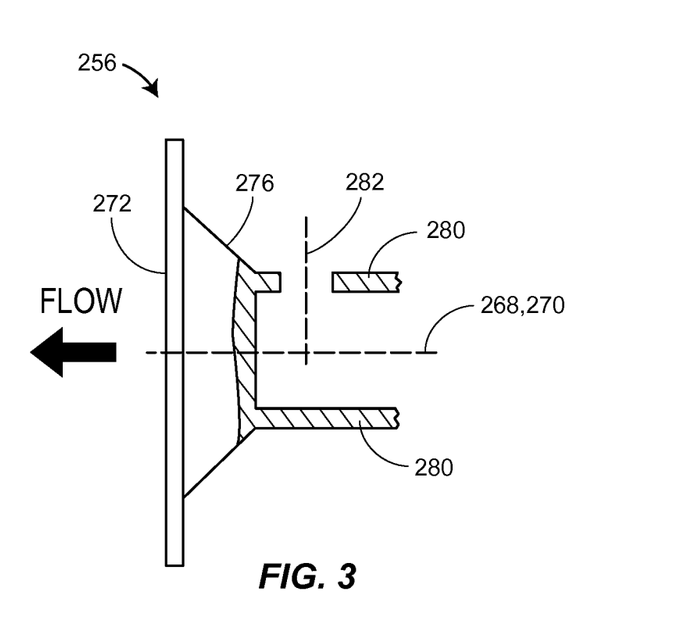
FIG. 3 is an enlarged fragmentary cross-sectional view of a downstream end of a sense tube assembled in accordance with the teachings of a second disclosed example of the present invention and that can be utilized in the regulating device shown in FIG. 2A.

It will be appreciated that the sensing hole 274 illustrated herein can vary and yet still fall within the principles of the present invention. In some examples, the sensing hole 274 can be formed in a different position in or along the second portion 260 of the sense tube 256. The sensing hole 274 can, for example, be formed at a position that is closer to or further from the flared portion 276. The sensing hole 274 can, as another example, be formed such that it extends at a different angle (e.g., 45 degrees, substantially perpendicular) relative to the central longitudinal axis 268 and/or the axis 270 of the outlet 216 (i.e., the sensing hole 274 need not be oriented perpendicular to the fluid flow and/or the axis 268). While the sensing hole 274 is illustrated in FIG. 2B as being formed in the lower quadrant of the tubular wall 280, the sensing hole 274 can be formed in a different portion of the tubular wall 280 of the sense tube 256. As illustrated in FIG. 3, the sensing hole 274 can, for example, be formed in an upper semi-cylindrical portion of the tubular wall 280 (the upper semi-cylindrical portion being defined as or corresponding to the portion of the tubular wall 280 above the plane in which the central longitudinal axis 268 lies). In other examples, particularly when the sense tube 256 has a differently shaped cross-section (i.e., the sense tube 256 is not a cylindrical sense tube), the sensing hole 274 can be formed in any number of different portions of the sense tube 256. Furthermore, the sensing hole 274 can vary in shape and/or size. The sensing hole 274 can, for example, have a rectangular, triangular, irregular, or other shape in cross-section. Likewise, the sensing hole 274 can have a diameter $D_{hole}$ or size that is larger or smaller than the sensing hole 274 illustrated in FIG. 2B (which has a diameter $D_{hole}$ of approximately 1.2 mm). As noted above, the diameter $D_{hole}$ of the sensing hole 274 can vary based on, for example, the size of the fluid regulating device 200. Finally, it will be appreciated that more than one sensing hole 274 can be formed in the second portion 260 of the sense tube 256. For example, the sense tube 256 can include two sensing holes 274 formed at or in different portions of the second portion 260.

As briefly discussed above, the sense tube 256 is force-balanced such that the second portion 260 is self-positionable based on the flow characteristics of the fluid flowing through the outlet 216 of the valve body 208. This allows the second end 272 and the sense hole 274 to be disposed or retracted within the valve body 208 under low or no flow conditions but disposed or extended outside (i.e., downstream) of the outlet 216 of the valve body 208 under normal or high flow conditions.

Figure 4A:
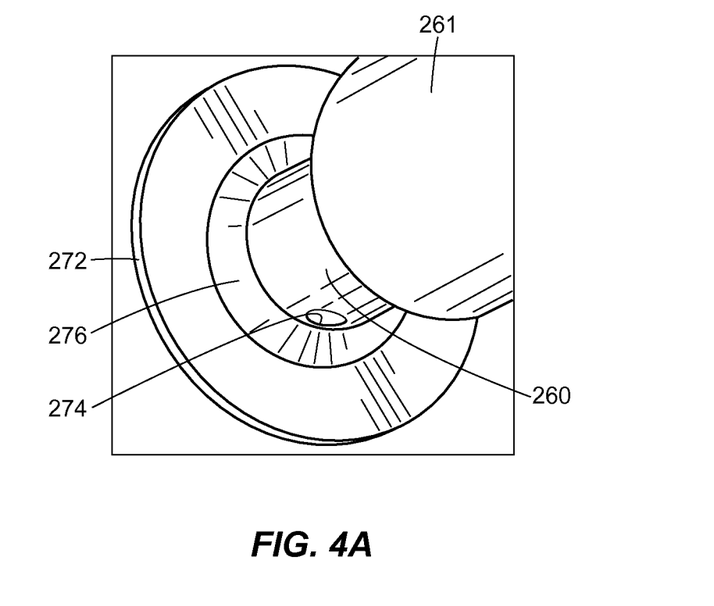
FIG. 4A is an enlarged perspective view of a downstream end of the sense tube illustrated in FIG. 2A, the downstream end being in a first position.
Figure 4B:
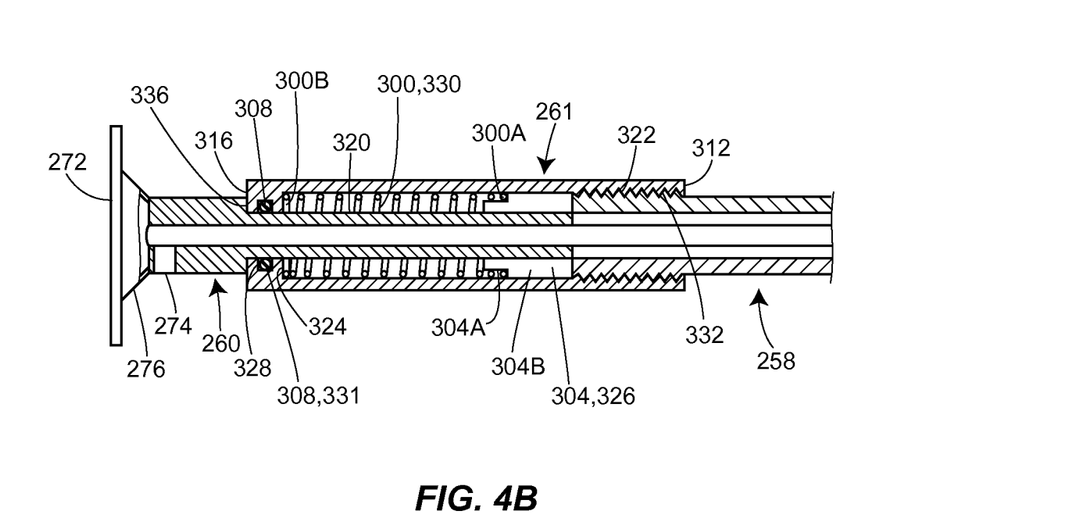
FIG. 4B is an enlarged fragmentary cross-sectional view of the downstream end of the sense tube when the downstream end is in the first position shown in FIG. 4A.
Figure 5A:
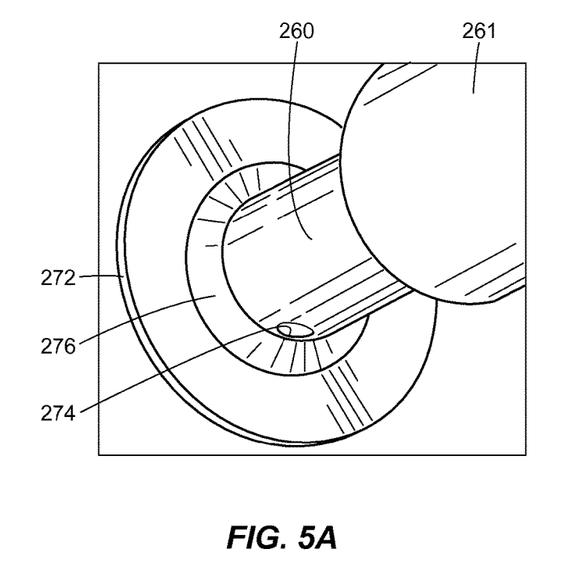
FIG. 5A is an enlarged perspective view of a downstream end of the sense tube illustrated in FIG. 2A, the downstream end being in a second position downstream of the first position illustrated in FIG. 4A.
Figure 5B:
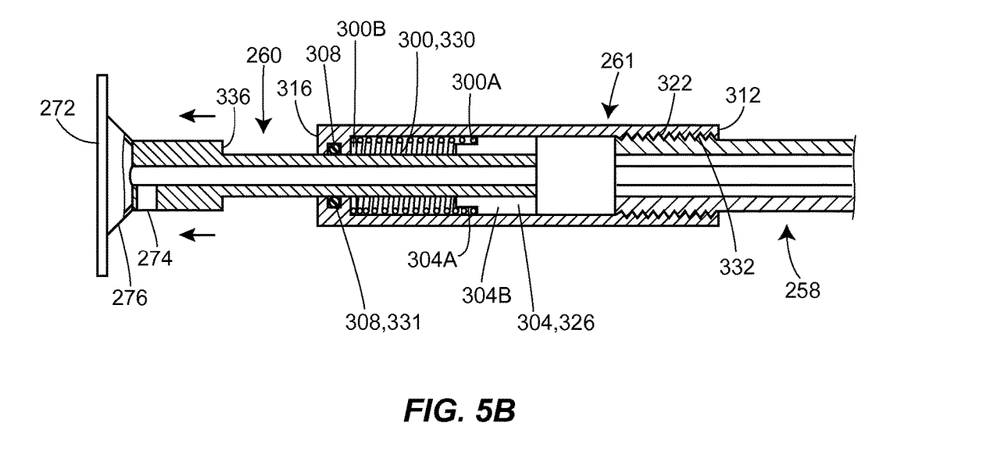
FIG. 5B is an enlarged fragmentary cross-sectional view of the downstream end of the sense tube when the downstream end is in the second position shown in FIG. 5A.

With reference to FIGS. 4A, 4B, 5A, and 5B, the sense tube 256 includes the sleeve 261, briefly mentioned above, as well as a biasing element 300, a seat 304 for the biasing element 300, and a sealing element 308. The sleeve 261 in this example is a cylinder that has a first or upstream end 312, a second or downstream end 316, and a hollow interior 320. The sleeve 261 also has a threaded portion 322 adjacent the upstream end 312 and an inwardly extending wall or shelf 324 adjacent the downstream end 316. The downstream end 316 and the inwardly extending wall 324 together define an aperture 328. The biasing element 300 and the seat 304 are coupled to the second portion 260 of the sense tube 256, as illustrated in FIGS. 4B and 5B. The biasing element 300, which in this example is a spring 330, is movably disposed in the interior 320 of the sleeve 261 between the upstream end 312 and the downstream end 316. More specifically, the biasing element 300 is movably disposed between the seat 304 and the shelf 324, with one end 300A of the biasing element 300 engaging the seat 304 and the other end 300B of the biasing element 300 engaging the shelf 324. So arranged, the biasing element 300 biases the second portion 260, particularly the end 272 and the sense hole 274, toward the first portion 258 of the sense tube. The seat 304 is movably disposed in the interior 320 of the sleeve 261 between the upstream end 312 and the shelf 324. The seat 304 in this example is an annular bushing 326 that has a first portion 304A arranged to engage the second end 300B of the biasing element 300 and a second portion 304B of a larger diameter than the first portion 304A. Though not illustrated herein, the first portion 304A includes a safety tab or stop that serves to maintain the second end 300B of the biasing element 300 in engagement with the seat 304, thereby keeping the sleeve 261, and more generally the sense tube 256, spring-loaded. This could, of course, be accomplished in a different manner (e.g., a tab or protrusion formed in the interior 320 of the sleeve 261). As illustrated in FIGS. 4B and 5B, the sealing element 308 in this example is an o-ring 331 disposed or seated in the aperture 328 defined between the downstream end 316 and the wall 324 of the sleeve 261. So disposed, the sealing element 308 serves to seal the sleeve 261 from fluid flowing through the outlet 216.

With continued reference to FIGS. 4A, 4B, 5A, and 5B, the first portion 258 of the sense tube 256 is fixedly coupled to the sleeve 261 while the second portion 260 of the sense tube 256 is movably coupled to the sleeve 261. In this example, the first portion 258 has a threaded portion 332 that threadingly engages the threaded portion 322 of the sleeve 261 to fixedly couple the first portion 258 to the sleeve 261. As such, the first portion 258 is partially disposed within the sleeve 261. The second portion 260, meanwhile, is movably coupled to the sleeve 261 via the biasing element 300 and the seat 304. In this example, the second portion 260 has a shoulder 336. The portion of the second portion 260 downstream of the shoulder 336, which includes the second end 272 and the sensing hole 274, is, by virtue of the shoulder 336 having a larger diameter than the hollow interior 320, always disposed outside of the sleeve 261. The portion of the second portion 260 upstream of the shoulder 336 is slidably (e.g., telescopically) disposed within the sleeve 261.

So configured, the second portion 260 of the sense tube 256 is movable (e.g., slidable) into or out of the sleeve 261 depending on the characteristics (e.g., the level) of the fluid flowing between the inlet 212 and the outlet 216. When no to little fluid flows between the inlet 212 and the outlet 216 (e.g., during manufacture, assembly, or installation), such that there is no to little force applied by the fluid on the flared portion 276 in the downstream direction (the leftward direction in FIGS. 4B and 5B), the spring force applied by the biasing element 300 on the second portion 260 in the upstream direction (the rightward direction in FIGS. 4B and 5B) is greater than any force applied to the second portion 260 in the downstream direction. As such, the biasing element 300 biases the second portion 260 to the first or retracted position illustrated in FIGS. 4A and 4B. In this position, the second portion 260 is substantially disposed within the sleeve 261, with the second end 272, the sense hole 274, and the flared portion 276 positioned adjacent or proximate to the downstream end 316 of the sleeve 261. So positioned, the second end 272, the sense hole 274, and the flared portion 276 are disposed within the valve body 208. In other words, the second end 272, the sense hole 274, and the flared portion 276 do not extend outside (i.e., downstream) of the valve body 208.

As, however, the level of fluid flowing between the inlet 212 and the outlet 216 increases, the force applied by the fluid on the flared portion 276 in the downstream direction increases. At some point, this force will exceed the spring force applied by the biasing element 300, at which time the second portion 260 and the seat 304 will start to move (e.g., slide) outward or downstream and away from the first portion 258. This, in turn, causes the biasing element 300 to compress (the degree to which it compresses will depend upon the specifics of the biasing element 300). Eventually, when the fluid flowing between the inlet 212 and the outlet 216 reaches a first pre-determined flow level (e.g., the desired normal or high flow level), the second portion 260 and the seat 304 are moved downstream to the second or extended position illustrated in FIGS. 5A and 5B. As illustrated, the second end 272 and the sensing hole 274 are disposed further downstream when the second portion 260 is in the extended position (as compared to when the second portion 260 is in the retracted position). So positioned, the second end 272, the sense hole 274, and the flared portion 276 extend outside of or downstream past the outlet 216 of the valve body 208. This allows the sense hole 274 to sense more developed flow and avoid larger turbulence zones, particularly under high flow conditions.

Conversely, when the level of fluid flowing between the inlet 212 and the outlet 216 decreases, the force applied by the fluid on the flared portion 276 in the downstream direction decreases. At some point, this force will be less than the spring force applied by the biasing element 300, at which time the second portion 260 will start to retract within the sleeve 261 (i.e., move upstream or toward the first portion 258). Eventually, when the fluid flowing between the inlet 212 and the outlet 216 reaches a second pre-determined flow level (e.g., the desired low flow level or a zero flow level), the second portion 260 and the seat 304 are moved upstream to the first or retracted position discussed above in connection with FIGS. 4A and 4B.

It will be appreciated that the sense tube 256 described herein can vary and yet still fall within the principles of the present invention. While the sense tube 256 is illustrated as being a cylindrical sense tube having two movably coupled portions, the present invention is not limited to cylindrical sense tubes having two movably coupled portions. Instead, the sense tube 256 can include, for example, a generally rectangular, triangular, square, irregular, or other cross-section. The sense tube 256 can also include more than two portions. Notwithstanding the above discussion, the end 272 of the sense tube 256 can, instead of being closed, be open, with the sense tube 256 sensing the outlet pressure via this movable (e.g., retractable) flared end 272. Moreover, the first and second portions 258, 260 can themselves vary. The first portion 258, for example, need not include the intermediate or bent portion 264. The second portion 260 can be shorter or longer than the second portion 260 illustrated herein, such that the second portion 260 does not extend as far downstream or extends further into the downstream piping when the second portion 260 is in the extended position. The second portion 260, or portions thereof, can be angled relative to the central longitudinal axis 268. It is also possible for the first portion 258 and the second portion 260 to be movably coupled to one another in a different manner than what is described herein. In some cases, the sleeve 261, the biasing element 300, the seat 304, and/or the sealing element 308 can vary. The sleeve 261 can, for example, have a different shape and/or different size, particularly when the shape and/or size of the sense tube 256 varies. The biasing element 300 can also take the form of a different spring or another component configured to serve the same purpose. It will also be appreciated that the spring force applied by the biasing element 300 will vary according to the biasing element 300 employed in the fluid regulating device 200.

The seat 304 can also vary in shape and/or size. The sealing element 308 can be a different type of seal (e.g., a gasket).

Based on the foregoing description, it should be appreciated that the devices, systems, and methods described herein more accurately sense the outlet pressure in a fluid regulating device and, in turn, provide a more accurate pressure signal to the diaphragm in the fluid regulating device. Accordingly, the accuracy and the maximum performance of the fluid regulating device can be improved. Gas utilities, which bill customers for gas consumption based on an assumed outlet pressure setting, will find these improvements particularly advantageous. With more accurate flow rates possible, gas utilities may, for example, use the fluid regulating device disclosed herein across a larger range of applications that require a minimum amount of gas delivery under all loads.

Based on the foregoing description, it should also be appreciated that the devices, systems, and methods described herein provide a sense tube that is self-positionable based on the flow characteristics of the fluid flow through the outlet of the valve body. Under normal or high flow conditions (e.g., during normal operation of the fluid regulating device), the sense tube is force-balanced to at least partially extend outside of the outlet of the valve body, while the sense tube is force-balanced to retract within the valve body under low or no conditions (e.g., during installation of the fluid regulating device). In this manner, the sense tube disclosed herein can sense developed flow and avoid larger turbulence zones, particularly under high flow conditions, while simplifying the manufacture, assembly, and installation of the associated fluid regulating device.

Preferred embodiments of this invention are described herein, including the best mode or modes known to the inventors for carrying out the invention. Although numerous examples are shown and described herein, those of skill in the art will readily understand that details of the various embodiments need not be mutually exclusive. Instead, those of skill in the art upon reading the teachings herein should be able to combine one or more features of one embodiment with one or more features of the remaining embodiments. Further, it also should be understood that the illustrated embodiments are exemplary only, and should not be taken as limiting the scope of the invention. All methods described herein can be performed in any suitable order unless otherwise indicated herein or otherwise clearly contradicted by context. The use of any and all examples, or exemplary language (e.g., "such as") provided herein, is intended merely to better illuminate the aspects of the exemplary embodiment or embodiments of the invention, and do not pose a limitation on the scope of the invention. No language in the specification should be construed as indicating any non-claimed element as essential to the practice of the invention.

What is claimed is:

1. A fluid regulating device, comprising:
   a valve body having an inlet, an outlet, and a valve port;
   a control element shiftably disposed within the valve body, the control element adapted to be displaced relative to the valve port to control the flow of a fluid between the inlet and the outlet;
   a control assembly operatively coupled to the control element, the control assembly including a diaphragm disposed adjacent a diaphragm chamber; and
   a sense tube having a first end, a second end, and a sense hole formed in the sense tube adjacent the second end, the first end being positioned to provide flow communication with the diaphragm chamber of the control assembly, the second end being disposed proximate to the outlet, and the second end being movable, relative to the first end, between a first position within the valve body and a second position extending outside of the valve body adjacent the outlet, the movement being in response to fluid flowing between the inlet and the outlet.

2. The fluid regulating device of claim 1, wherein the second end is movable along an axis that is at least substantially parallel to an axis of the outlet.

3. The fluid regulating device of claim 1, wherein the second end is closed, and wherein the sense hole is formed proximate to the closed second end and extends along an axis that is angled relative to an axis of the outlet.

4. The fluid regulating device of claim 1, wherein the sense tube has a flared portion disposed proximate to the second end, the sense hole being spaced away from and upstream of the flared portion, the second end of the sense tube being movable in response to fluid flowing around the flared portion.

5. The fluid regulating device of claim 1, further comprising a biasing element arranged to bias the second end of the sense tube to the first position.

6. The fluid regulating device of claim 5, further comprising a sleeve disposed around a portion of the sense tube extending between the first and second ends of the sense tube, the sleeve having an external diameter greater than an external diameter of the sense tube, and the biasing element being movably disposed in the sleeve.

7. The fluid regulating device of claim 6, wherein the second end is movably coupled to the sleeve.

8. The fluid regulating device of claim 1, wherein the sense tube has a first portion and a second portion, the first portion including the first end and an intermediate portion, and the second portion carrying the second end and the sense hole, the second portion being movable relative to the first portion in response to fluid flowing between the inlet and the outlet.

9. A fluid regulating device, comprising:
   a valve body having an inlet, an outlet, and a valve port;
   a control element shiftably disposed within the valve body, the control element adapted to be displaced relative to the valve port to control the flow of a fluid between the inlet and the outlet;
   a control assembly operatively coupled to the control element, the control assembly including a diaphragm disposed adjacent a diaphragm chamber; and
   a sense tube having a first end, a second end, and a sense hole, the first end positioned to provide flow communication with the diaphragm chamber of the control assembly, the second end disposed proximate to the outlet, the sense tube comprising a first portion and a second portion, the first portion including the first end of the sense tube, and the second portion including the second end and the sense hole of the sense tube, the second portion being movable, relative to the first portion, between a first position within the valve body and a second position at least partially extending outside of the valve body adjacent a distal portion of the outlet, the movement being in response to fluid flowing between the inlet and the outlet.

10. The fluid regulating device of claim 9, wherein the second portion extends along a central longitudinal axis, and wherein the second end is closed and the sense hole is formed in the second portion upstream of the closed end, the sense hole extending along an axis that is angled relative to the central longitudinal axis.

11. The fluid regulating device of claim 9, wherein the second end is flared, the second portion being movable in response to fluid flowing around the flared second end.

12. The fluid regulating device of claim 9, further comprising a sleeve extending along a portion of the sense tube, the sleeve having an external diameter greater than an external diameter of the sense tube, the first portion of the sense tube being fixedly coupled to the sleeve, and the second portion of the sense tube being movably coupled to the sleeve.

13. The fluid regulating device of claim 12, further comprising a biasing element movably disposed in the sleeve, the biasing element arranged to bias the second portion of the sense tube to the first position.

14. The fluid regulating device of claim 12, wherein the second portion of the sense tube is telescopically disposed within the sleeve.

15. The fluid regulating device of claim 12, wherein the second portion is in the first position when no fluid is flowing between the inlet and the outlet, the second portion being movable to the second position in response to a pre-determined level of fluid flowing between the inlet and the outlet.

16. A sense tube assembly for sensing output pressure for a fluid regulating device, the fluid regulating device comprising a valve body, a control element shiftably disposed within the valve body, and a control assembly operatively coupled to the control element, the valve body having an inlet, an outlet, and a valve port, the control element adapted to be displaced relative to the valve port to control the flow of a fluid between the inlet and the outlet, the control assembly including a diaphragm disposed adjacent a diaphragm chamber, the sense tube assembly comprising:

a first portion adapted to be positioned to provide flow communication with the diaphragm chamber of the control assembly;

a second portion adapted to be positioned proximate to the outlet, the second portion including an end and a sense hole for sensing pressure at the outlet, the end of the second portion being movable relative to the first portion; and a biasing element arranged to bias the end of the second portion to a first position, the end of the second portion being movable to a second position downstream of the first position in response to fluid flowing between the inlet and the outlet.

17. The sense tube assembly of claim 16, wherein the second portion includes a flared portion carried adjacent the end, the end being movable to the second position in response to fluid flowing around the flared portion.

18. The sense tube assembly of claim 16, wherein the end of the second portion is closed and the sense hole is formed upstream of the closed end, the sense hole extending along an axis that is angled relative to a central longitudinal axis of the second portion.

19. The sense tube assembly of claim 16, further comprising a sleeve extending along a portion of the sense tube, the sleeve having an external diameter greater than an external diameter of the first and second portions, the first portion being fixedly coupled to the sleeve, and the second portion being movably coupled to the first portion via the sleeve.

20. The sense tube assembly of claim 19, wherein the second portion includes a seating element movably disposed within the sleeve, the biasing element being seated on the seating element.

* * * * *